United States Patent
Cho

(10) Patent No.: US 6,384,866 B1
(45) Date of Patent: May 7, 2002

(54) HORIZONTAL DISPLAY POSITIONING CIRCUIT FOR CRT-TYPE DISPLAY DEVICE

(75) Inventor: Yong-moon Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/149,298

(22) Filed: Sep. 9, 1998

(30) Foreign Application Priority Data

Sep. 9, 1997 (KR) .............................................. 97-46248

(51) Int. Cl.[7] .............................. H04N 5/04; H04N 9/44
(52) U.S. Cl. ........................ 348/511; 348/552; 348/545
(58) Field of Search ................................. 348/554, 555, 348/556, 558, 552, 542, 545; 345/154, 532, 127; H04N 5/04, 9/44, 11/00, 7/00

(56) References Cited

U.S. PATENT DOCUMENTS

| | | | | |
|---|---|---|---|---|
| 4,467,359 A | * | 8/1984 | Hosoya ........................ | 348/541 |
| 4,837,626 A | * | 6/1989 | Nishiyama et al. .......... | 348/554 |
| 5,614,956 A | * | 3/1997 | Matsuura ..................... | 348/556 |
| 5,808,692 A | * | 9/1998 | Lee .............................. | 348/542 |
| 5,978,040 A | * | 11/1999 | Diamant ..................... | 348/556 |
| 6,037,994 A | * | 3/2000 | Bae ............................. | 348/542 |
| 6,078,301 A | * | 6/2000 | Arai et al. ................... | 345/127 |

* cited by examiner

*Primary Examiner*—Michael Lee
*Assistant Examiner*—Tran U. Tran
(74) *Attorney, Agent, or Firm*—Staas & Halsey LLP

(57) ABSTRACT

A horizontal display positioning circuit for a CRT-type display device includes a microcomputer, a horizontal deflection circuit, and a horizontal positioning control circuit configured between the microcomputer and the horizontal deflection circuit, for outputting a horizontal sync signal having a predetermined duty width. The microcomputer, which receives synchronizing signals from a host computer and discriminates a video mode according to the received synchronizing signals, outputs a horizontal sync signal having a given polarity. The horizontal deflection circuit includes a horizontal oscillating circuit which generates a horizontal deflection signal, a horizontal drive circuit which performs waveform correction of the generated horizontal deflection signal and drives an output transistor, and a horizontal output circuit which includes the output transistor and produces a sawtooth current through a deflection coil based on the operation of the output transistor. The horizontal positioning control circuit includes a multivibrator which uses the horizontal sync signal output from the microcomputer as a trigger signal and operates in accordance with a time constant set by a resistor and a capacitor. A Q flip-flop is used as the multivibrator.

4 Claims, 4 Drawing Sheets

HORIZONTAL DISPLAY POSITIONING CIRCUIT FOR CRT-TYPE DISPLAY DEVICE

CROSS-REFERENCE TO RELATED APPLICATIONS

This application makes reference to, incorporates the same herein, and claims all benefits accruing under 35 U.S.C. §119 from my application entitled Horizontal Position Control Circuit of a Display Apparatus filed with the Korean Industrial Property Office on Sep. 9, 1997 and there duly assigned Serial No. 97-46248 by that Office.

BACKGROUND OF THE INVENTION

1. Field of the Invention

The present invention relates to a horizontal position control circuit of a display device and, more particularly, to a horizontal position control circuit having a horizontal position control function by which a displayed image can be positioned horizontally (centered) on a monitor screen regardless of the frequency of the horizontal sync signal provided by a video card located, typically, in the main body of a host computer.

2. Description of the Related Art

In a CRT-type display device, a deflection circuit controls electron beam deflection so that images are formed on a screen through an electrostatic deflection, using yokes (coils) mounted on the CRT. The images are displayed on the screen in accordance with sawtooth waveform current signals respectively applied to horizontal and vertical coils.

As shown in FIG. 1, a conventional horizontal display positioning circuit is largely comprised of: a microcomputer 20 for discriminating various display modes based on horizontal and vertical sync signals received from a host computer (not shown) and, in accordance with the discriminated mode, outputting a pulse width modulated (PWM) control signal and a horizontal sync output signal; a horizontal deflection circuit 40 and a horizontal deflection yoke 60. The horizontal deflection circuit 40 includes a horizontal oscillating circuit 41, which generally includes a blocking oscillation circuit and has position control circuitry (not shown), wherein the horizontal oscillating circuit 41 generates a horizontal deflection signal based upon the PWM control signal and the horizontal sync output signal; a horizontal drive circuit 42 which performs waveform correction of the horizontal deflection signal and drives an output transistor (of the next stage); and a horizontal output circuit 43 which produces a sawtooth current waveform through the horizontal deflection coil (yoke) 60 based on the operation of the output transistor of the horizontal output circuit 43. A resistor R3 is connected to a voltage Vcc and provides for user (manual) adjustment of the horizontal display.

As shown in FIGS. 1 and 2A, the microcomputer 20 generates a horizontal sync output signal as a positive-going value based on the horizontal sync signal from the host computer. The horizontal sync output signal is filtered through an RC network having a resistor R2 and a capacitor C2 and the filtered horizontal sync output signal is applied as a horizontal sync input signal to the horizontal oscillating circuit 41.

To control the screen position of a displayed image horizontally, the horizontal oscillating circuit 41 uses the center point of the "on" cycle of the PWM control signal as a reference, as shown in FIG. 2B. Here, it should be noted that the polarity of the PWM waveform, i.e., whether it be active negative or active positive, is fixed without regard to the polarity of the horizontal sync signal as supplied by the host computer. Actually, a resistor R1 and smoothing capacitor C1 are used to "rectify" the PWM control signal from the microcomputer 20, and the resistor R3 adjusts the rectified PWM control signal to generate a position control signal which is input to the horizontal oscillating circuit 41, thereby enabling a user (manual) adjustment of the horizontal display.

Once a displayed image is positioned at the horizontal center point of a monitor screen according to the monitor's video reference mode, should the video mode become redefined, the image is displayed with a new center point, i.e., one that is shifted by an amount corresponding to the change in duty width of the incoming horizontal sync signal. That is, if a horizontal sync signal from the host computer and having an increased duty width is input to the microcomputer 20, the PWM control signal, as shown in FIG. 2C, exhibits a greater duty width, which is represented by a gap g.

To maintain the position of the displayed image at the center point of the screen, the microcomputer 20 computes a horizontal position control (compensation) signal based on the horizontal sync signal input thereto and outputs the result as the PWM waveform. This output is the result of a microcomputer calculation based on the frequency of the incoming horizontal sync signal, to thereby produce the PWM control signal having a duty ratio reflecting the "screen shift" carried out by the position control circuitry (not shown) of the horizontal oscillating circuit 41. The amount of screen shift corresponds to the size of the gap g in FIG. 2C.

The horizontal oscillation circuit 41 superimposes the PWM waveform onto the horizontal sync input signal, thereby producing a compensating current value. Here, the PWM waveform has a duty width proportionate to the degree to which the screen is horizontally shifted in accordance with the duty width variation (gap) of the horizontal sync signal of a given video mode.

Accordingly, for anticipated display modes, i.e., those considered at the time of monitor design, a displayed image can be accurately positioned (centered) on the screen independent of duty width variations in the incoming horizontal sync signal, using the monitor's reference mode to center the image display.

However, if a horizontal sync signal having a frequency not considered at the time of monitor design is input, the screen position which is thus shifted by as much as the gap of the unexpected sync signal's duty width is not compensated by the PWM control signal from the microcomputer 20, thereby resulting in an undesired shifting of the displayed image to the left or right of center. This also gives rise to video card compatibility problems and impedes manual efforts (user adjustments) to center an image display in the screen horizontally.

SUMMARY OF THE INVENTION

Accordingly, in order to overcome such drawbacks in the conventional art, it is therefore an object of the present invention to provide a horizontal positioning circuit which enables horizontal centering of a displayed image independently from the duty width of the incoming horizontal sync signal.

It is another object of the present invention to provide a horizontal positioning circuit which enables horizontal centering of a displayed image independently from the polarity of the incoming horizontal sync signal.

Additional objects and advantages of the invention will be set forth in part in the description which follows and, in part, will be obvious from the description, or may be learned by practice of the invention.

To achieve these and other advantages and in accordance with the purpose of the present invention, as embodied and broadly described, there is provided a horizontal display positioning circuit for a CRT-type display device, including a microcomputer, which receives synchronizing signals from a host computer and discriminates a video mode according to the received synchronizing signals, for outputting a first horizontal sync signal having a given polarity; a horizontal deflection circuit; and a horizontal position control circuit, configured between the microcomputer and the horizontal deflection circuit, for outputting a second horizontal sync signal having a predetermined duty width.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENT

Reference will now made in detail to the present preferred embodiments of the present invention, examples of which are illustrated in the accompanying drawings. The embodiments are described below in order to explain the present invention by referring to the figures.

Figure 1:
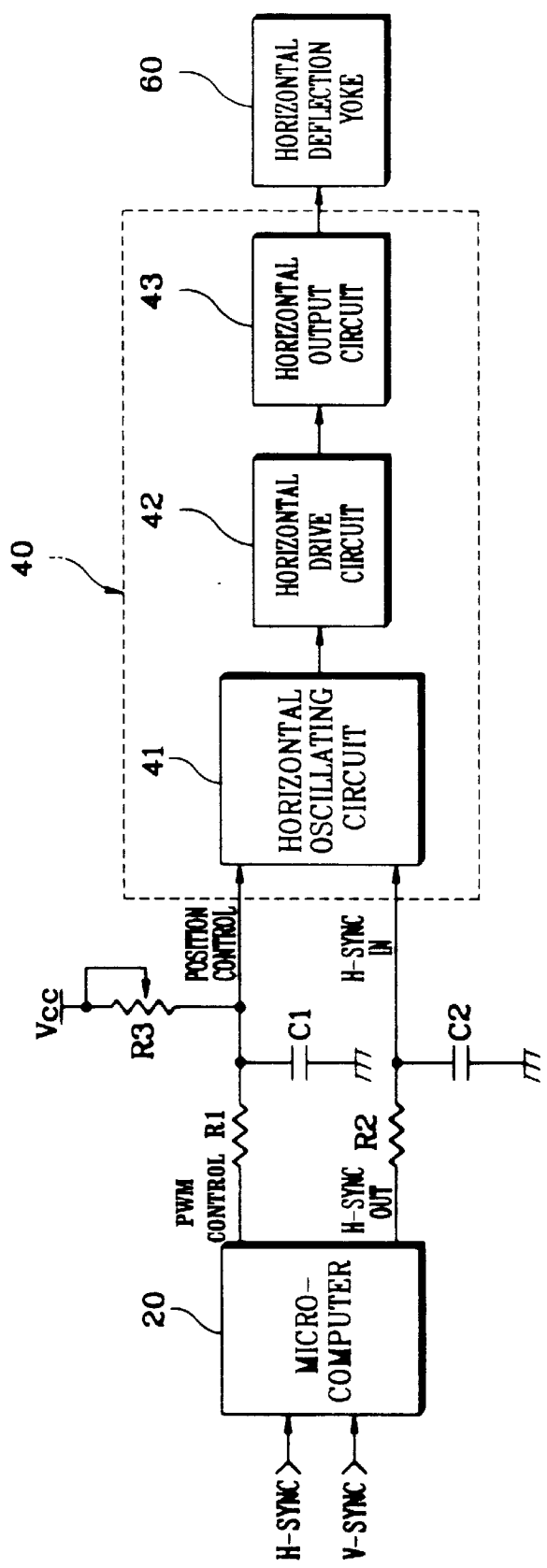
FIG. 1 is a circuit diagram of a horizontal display positioning circuit according to the conventional art.
Figure 2A:
FIGS. 2A through 2C are waveform diagrams illustrating various signals present in the horizontal display positioning circuit shown in FIG. 1.
Figure 2B:
Figure 2C:
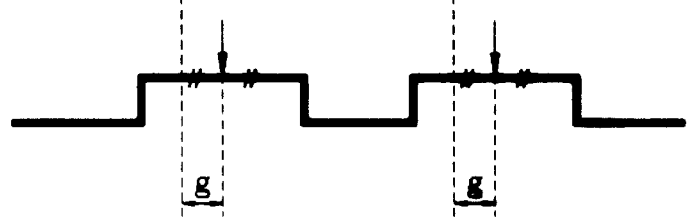
Figure 3:
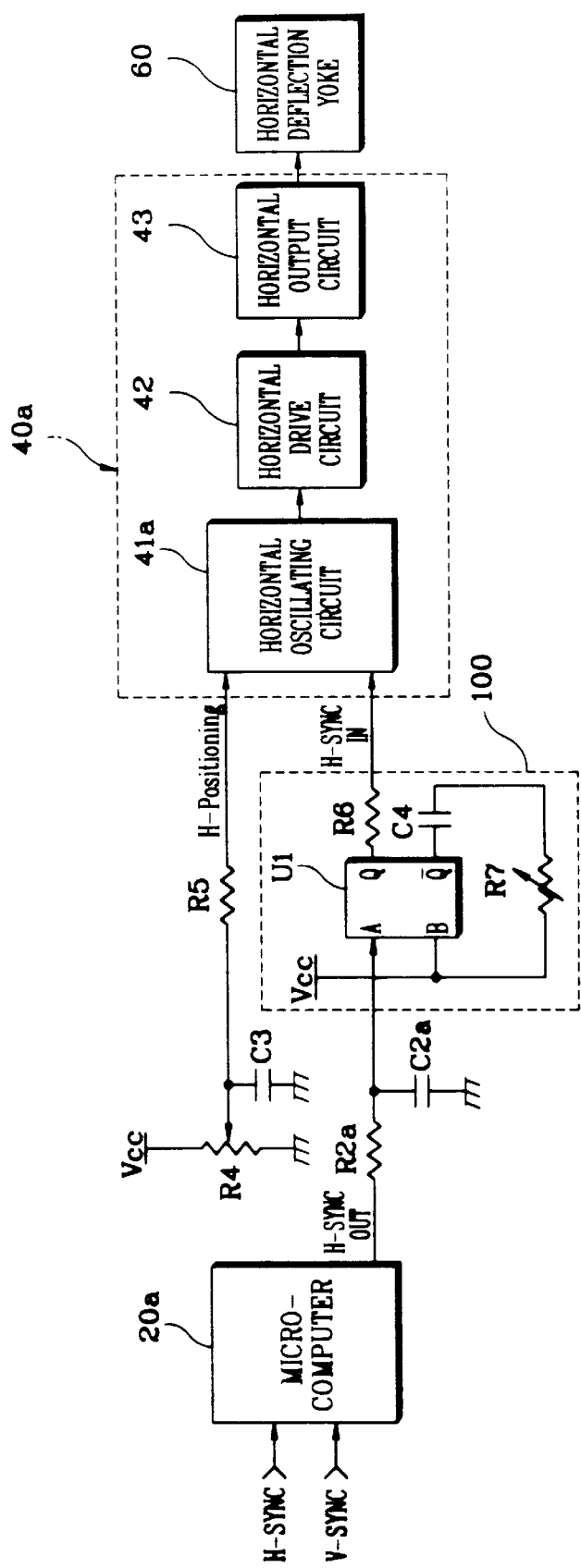
FIG. 3 is a circuit diagram of a horizontal display positioning circuit according to an embodiment of the present invention.

Referring to FIG. 3, a horizontal display positioning circuit is provided with a horizontal positioning circuit 100 according to an embodiment of the present invention, in which a microcomputer 20a generates a horizontal sync output signal having a given polarity for output to the horizontal positioning circuit 100, regardless of the polarity of the horizontal sync signal supplied from a video card (not shown). The horizontal positioning circuit 100 is made up of a multivibrator comprising a flip-flop U1 which maintains a constant duty width of the Q output pulse from a resistor R6, by using the time constant established by a resistance R7 and a capacitor C4, to generate the horizontal sync input signal. For user (manual) adjustment of the horizontal display, a resistor R4 provides an H-positioning signal (current biasing input) using voltage Vcc to a horizontal oscillating circuit 41a of a horizontal deflection circuit 40a via a smoothing capacitor C3 and a resistor R5.

The horizontal positioning circuit 100 generates a Q output pulse (horizontal sync input signal) which is received by horizontal deflection circuit 40a. The horizontal deflection circuit 40a generates an output which produces a sawtooth current through a horizontal deflection yoke 60, based upon the horizontal sync input signal and the H-positioning signal (current biasing input). The horizontal deflection circuit 40a includes the horizontal oscillating circuit 41a, a horizontal drive circuit 42 and a horizontal output circuit 43.

The horizontal oscillating circuit 41a generates a horizontal deflection signal based upon the H-positioning signal (current biasing input) and the horizontal sync input signal input to the horizontal oscillating circuit 41a. The horizontal drive circuit 42 performs waveform correction of the horizontal deflection signal from the horizontal oscillating circuit 41a to drive an output transistor of the horizontal output circuit 43. The horizontal output circuit 43 produces a sawtooth current waveform through the horizontal deflection yoke (coil) 60 based on the operation of the output transistor.

Figure 4A:
FIGS. 4A and 4B are waveform diagrams illustrating various signals present in the horizontal display positioning circuit shown in FIG. 3.
Figure 4B:

As shown in FIG. 4A, the horizontal sync output signal, which is fed to the Q flip-flop U1 (terminal A), triggers the Q flip-flop 40 on the negative-going edge thereof, after being filtered through an RC network including a resistor R2a and a capacitor C2a. As shown in FIG. 4B, the Q output pulse has a constant duty width d, which is based on the established time constant (R7C4), thus nullifying that portion of the pulse represented by an area e. The Q flip-flop U1 triggers on the negative-going edge of the filtered horizontal sync output signal, in order to determine the duty width of the horizontal sync input signal input to the horizontal oscillating circuit 41a. The achieved duty width corresponds to design requirements as determined by the set time constant.

Thus, the horizontal sync input signal having a fixed form in accordance with the criteria of the monitor's reference mode is input to the horizontal oscillating circuit 41a, so that the image is displayed at the horizontal center point of the monitor screen regardless of the discriminated video mode. In other words, once the displayed image under the monitor reference mode is centered using the variable resistor R7 (factory setting), the image stays centered when the video mode is changed, even though the duty width of the horizontal sync output signal varies and a gap with respect to the reference mode is created. Furthermore, the horizontal positioning is maintained regardless of the polarity of the horizontal sync signal output of the employed video card.

As explained above, the present invention has certain advantages over the conventional art. Firstly, the displayed image can be horizontally positioned at the center point of the screen without regard to the duty width of the horizontal sync signal as determined by the input mode. Secondly, the microcomputer does not require internal control circuitry for generating the PWM signal output. Thirdly, greater compatibility among video cards is provided since screen images are always positioned at the center of the display device even though an unexpected horizontal sync frequency may be used (i.e., input from the video card).

It will be apparent to those skilled in the art that various modifications can be made in the horizontal display positioning circuit for a display device of the present invention, without departing from the spirit of the invention. Thus, it is intended that the present invention cover such modifications as well as variations thereof, within the scope of the appended claims and their equivalents.

What is claimed is:

1. A horizontal display positioning circuit for a CRT-type display device and which receives synchronizing signals from a host computer, comprising:

a microcomputer, which receives the synchronizing signals from the host computer and discriminates a video mode according to the received synchronizing signals, to output a first horizontal sync signal having a given polarity;

a multivibrator which generates a second horizontal sync signal triggered by the first horizontal sync signal;

a horizontal deflection circuit, comprising:
  a horizontal oscillating circuit which generates a horizontal deflection signalbased upon the second horizontal sync signal,
  a horizontal drive circuit which performs waveform correction of the horizontal deflection signal and drives an output transistor, and
  a horizontal output circuit which includes the output transistor and produces a sawtooth current through a deflection coil based on operation of the output transistor; and an adjustment circuit, adjustable by a user and independent of said microcomputer, to generate a horizontal positioning signal, wherein said horizontal oscillating circuit superimposes the horizontal positioning signal on the second horizontal sync signal, to generate the horizontal deflection signal, wherein said adjustment circuit comprises:
  an adjustable resistor connected to a voltage potential,
  a capacitor to form an RC circuit with said adjustable resistor, and
  a resistor having a first end connected to said RC circuit and a second end connected to said horizontal oscillating circuit.

2. A horizontal display positioning circuit for a CRT-type display device and which receives synchronizing signals from a host computer, comprising:

a microcomputer, which receives the synchronizing signals from the host computer and discriminates a video mode according to the received synchronizing signals, to output a first horizontal sync signal having a given polarity;

a multivibrator which generates a second horizontal sync signal triggered by the first horizontal sync signal;

a horizontal deflection circuit, comprising:
  a horizontal oscillating circuit which generates a horizontal deflection signal based upon the second horizontal sync signal,
  a horizontal drive circuit which performs waveform correction of the horizontal deflection signal and drives an output transistor, and
  a horizontal output circuit which includes the output transistor and produces a sawtooth current through a deflection coil based on operation of the output transistor; and an adjustment circuit, adjustable by a user and independent of said microcomputer, to generate a horizontal positioning signal, wherein said horizontal oscillating circuit superimposes the horizontal positioning signal on the second horizontal sync signal, to generate the horizontal deflection signal, wherein said adjustment circuit comprises:
  an adjustable resistor connected to a voltage potential,
  a capacitor to form an RC circuit with said adjustable resistor, and
  a resistor having a first end connected to said RC circuit and a second end connected to said horizontal deflection circuit.

3. A display circuit for controlling the horizontal display of an image from a host computer on a CRT-type display device, the image having associated synchronizing signals provided by the host computer, the display circuit comprising:

a microcomputer, which receives the synchronizing signals from the host computer and discriminates a video mode according to the received synchronizing signals to output a first horizontal sync signal having a given polarity and a first duty width;

a multivibrator which uses the first horizontal sync signal as a trigger signal and which outputs a second horizontal sync signal synchronized with the first horizontal sync signal, the second horizontal sync signal having a second duty width independent of the polarity and the first duty width of the first horizontal sync signal, the multivibrator comprising:
  a Q flip-flop,
  a resistor, and
  a capacitor, wherein the resistor and the capacitor determine a time constant which sets the predetermined duty width; and a first circuit which provides a reference signal adjustable by a user, wherein the first circuit comprises:
  an adjustable resistor connected to a voltage potential,
  a capacitor which forms an RC circuit with the adjustable resistor, and
  a resistor connected between the RC circuit and the horizontal oscillating circuit; and a second circuit which drives a deflection coil in response to the second horizontal sync signal and adjusts a center position of the image in response to the reference signal.

4. A horizontal display circuit for a CRT-type display which receives horizontal synchronizing signals of an image to be displayed on a screen, the display circuit comprising:

a processor which discriminates a video mode according to the synchronizing signals and outputs a first horizontal sync signal;

a Q flip-flop which outputs a second horizontal sync signal having a duration independent of a duration of the first horizontal sync signal;

a horizontal deflection circuit which drives the CRT-type display in response to the second horizontal sync signal, to display the image on the screen; and a horizontal centering circuit which biases the horizontal deflection circuit to position the displayed image horizontally on the screen, the horizontal centering circuit comprising:
  an adjustable resistor connected to a voltage potential,
  a capacitor which forms an RC circuit with the adjustable resistor, and
  a resistor having a first end connected to the RC circuit and a second end connected to the horizontal deflection circuit.

* * * * *